United States Patent
Lemley et al.

(10) Patent No.: US 10,684,681 B2
(45) Date of Patent: Jun. 16, 2020

(54) NEURAL NETWORK IMAGE PROCESSING APPARATUS

(71) Applicant: FotoNation Limited, Galway (IE)

(72) Inventors: Joseph Lemley, Galway (IE);
Liviu-Cristian Dutu, Bucharest (RO);
Stefan Mathe, Bucharest (RO);
Madalin Dumitru-Guzu, Bucharest (RO)

(73) Assignee: FotoNation Limited, Galway (IE)

( * ) Notice: Subject to any disclaimer, the term of this patent is extended or adjusted under 35 U.S.C. 154(b) by 85 days.

(21) Appl. No.: 16/005,610

(22) Filed: Jun. 11, 2018

(65) Prior Publication Data
US 2019/0377409 A1    Dec. 12, 2019

(51) Int. Cl.
*G06F 3/01*    (2006.01)
*G06K 9/00*    (2006.01)
(Continued)

(52) U.S. Cl.
CPC ......... *G06F 3/013* (2013.01); *G06K 9/00248* (2013.01); *G06K 9/00281* (2013.01);
(Continued)

(58) Field of Classification Search
CPC ........ G06F 3/013; G06N 3/08; G06K 9/6217; G06K 9/00248; G06K 9/66; G06K 9/00281
See application file for complete search history.

(56) References Cited

U.S. PATENT DOCUMENTS 6,128,398 A * 10/2000 Kuperstein ........ G06K 9/00288
                                                      382/116
8,130,281 B2 * 3/2012 Kaneda .................. H04N 5/232
                                                      340/573.1
(Continued)

FOREIGN PATENT DOCUMENTS

EP    2743117 A1    6/2014
EP    3101622 A3    12/2016
(Continued)

OTHER PUBLICATIONS

International Search Report and Written Opinion for International Application No. PCT/EP2019/060596, Completed May 21, 2019, dated May 29, 2019,16 pgs.
(Continued)

*Primary Examiner* — Xuemei G Chen
(74) *Attorney, Agent, or Firm* — Lee & Hayes, PC (57) ABSTRACT

A neural network image processing apparatus arranged to acquire images from an image sensor and to: identify a ROI containing a face region in an image; determine at plurality of facial landmarks in the face region; use the facial landmarks to transform the face region within the ROI into a face region having a given pose; and use transformed landmarks within the transformed face region to identify a pair of eye regions within the transformed face region. Each identified eye region is fed to a respective first and second convolutional neural network, each network configured to produce a respective feature vector. Each feature vector is fed to respective eyelid opening level neural networks to obtain respective measures of eyelid opening for each eye region. The feature vectors are combined and to a gaze angle neural network to generate gaze yaw and pitch values substantially simultaneously with the eyelid opening values.

20 Claims, 4 Drawing Sheets

(51) Int. Cl.
*G06K 9/62* (2006.01)
*G06K 9/66* (2006.01)
*G06N 3/08* (2006.01)

(52) U.S. Cl.
CPC ............. *G06K 9/6217* (2013.01); *G06K 9/66* (2013.01); *G06N 3/08* (2013.01)

(56) References Cited

U.S. PATENT DOCUMENTS

| | | | | |
|---|---|---|---|---|
| 9,818,024 | B2* | 11/2017 | Bacivarov | G06K 9/00281 |
| 10,048,749 | B2* | 8/2018 | Miao | G06K 9/0061 |
| 10,157,313 | B1* | 12/2018 | Zhang | G06F 3/013 |
| 2002/0102024 | A1 | 8/2002 | Jones et al. | |
| 2003/0202685 | A1* | 10/2003 | Shimizu | G06K 9/00288 |
| | | | | 382/118 |
| 2008/0126281 | A1* | 5/2008 | Kisacanin | G06K 9/0061 |
| | | | | 706/20 |
| 2008/0317378 | A1* | 12/2008 | Steinberg | G06T 5/50 |
| | | | | 382/275 |
| 2011/0235919 | A1* | 9/2011 | Morita | A61B 5/18 |
| | | | | 382/195 |
| 2017/0372487 | A1* | 12/2017 | Lagun | A61B 3/113 |
| 2018/0039846 | A1* | 2/2018 | Grubb | G06K 9/00604 |
| 2018/0314881 | A1* | 11/2018 | Sud | G06F 1/163 |
| 2019/0043216 | A1* | 2/2019 | Yabuuchi | G06T 7/73 |
| 2019/0246036 | A1* | 8/2019 | Wu | G06K 9/00355 |
| 2019/0251707 | A1* | 8/2019 | Gupta | G06N 3/08 |
| 2019/0259174 | A1* | 8/2019 | De Villers-Sidani | G06T 7/90 |
| 2019/0279393 | A1* | 9/2019 | Ciuc | G06K 9/00268 |
| 2019/0303656 | A1* | 10/2019 | Lin | G06K 9/00362 |
| 2019/0303724 | A1* | 10/2019 | Linden | G06T 7/74 |
| 2019/0325200 | A1* | 10/2019 | Qian | G06K 9/00281 |
| 2019/0354178 | A1* | 11/2019 | Hwang | H04N 21/482 |
| 2019/0370577 | A1* | 12/2019 | Meng | G06K 9/00288 |
| 2019/0370580 | A1* | 12/2019 | Aoi | G06T 7/00 |

FOREIGN PATENT DOCUMENTS

| | | |
|---|---|---|
| WO | 2017/032468 A1 | 3/2017 |
| WO | 2017/108222 A1 | 6/2017 |
| WO | 2017/129325 A1 | 8/2017 |

OTHER PUBLICATIONS

Amer Al-Rahayfeh et al: "Eye Tracking and Head Movement Detection: A State-of-Art Survey", IEEE Journal of Translational Engineering in Health and Medicine, vol. 1, 2013, pp. 1-12, XP055590704, DOI: 10.1109/JTEHM.2013.2289879, section III.C "Car Assistant Systems".
Joseph Lemley et al: "Efficient CNN Implementation for Eye-Gaze Estimation on Low-Power/Low-Quality Consumer Imaging Systems," Jun. 28, 2018 (Jun. 28, 2018), XP055590709, Retrieved from the Internet: URL:https://arxiv.org/pdf/1806.10890.pdf [retrieved on May 21, 2019].
Flavio Luiz Coutinho, Carlos H. Morimoto: "Augmenting the robustness of cross-ratio gaze tracking methods to head movement", Association for Computing Machinery, Inc., ETRA 2012, Santa Barbara, CA, Mar. 28-30, 2012, pp. 59-66.
Kyle Krafka, Aditya Khosla, Petr Kellnhofer, Harini Kannan, Suchendra Bhandarkar, Wojciech Matusik, Antonio Torralba: "Eye Tracking for Everyone", 9 pages.
Erroll Wood, Tadas Baltrusaitis, Louis-Philippe Morency, Peter Robinson, Andreas Bulling: "Learning an appearance-based gaze estimator from one million synthesised images" ETRA '16, Mar. 14-17, 2016, Charlston, SC, USA, 8 pages.
Yunyang Li, Xin Xu, Nan Mu, and Li Chen: "Eye-Gaze Tracking System by Haar Cascade Classifier", 2016 IEEE 11th Conference on Industrial Electronics and Applications (ICIEA), 978-1-4673-8644-9/16, pp. 564-567.

Daniel González-Jiménez and José Luis Alba-Castro: "Shape-Driven Gabor Jets for Face Description and Authentication", IEEE Transactions on Information Forensics and Security, vol. 2, No. 4, Dec. 2007, pp. 769-780.
Nanxiang Li and Carlos Busso, "User-Independent Gaze Estimation by Exploiting Similarity Measures in the Eye Pair Appearance Eigenspace", ICMI'14, Nov. 12-16, 2014, Istanbul, Turkey, ACM 978-1-4503-2885-2/14/11, pp. 335-338.
Joseph Lemley, Anuradha Kar, and Peter Corcoran:"Real-Time Eye Gaze Estimation on Low Power Consumer Devices in the Wild with Deep Learning", IEEE Transactions on Consumer Electronics, Mar. 2, 2018, pp. 1-10.
Arantxa Villanueva, Victoria Ponz, Laura Sesma-Sanchez, Mikel Ariz, Sonia Porta, and Rafael Cabeza, Hybrid Method Based on Topography for Robust Detection of Iris Center and Eye Corners, ACM Transactions on Multimedia Computing, Communications and Applications, vol. 9, No. 4, Article 25, Publication date: Aug. 2013, 20 pages.
Elias Daniel Guestrin and Moshe Eizenman, "General Theory of Remote Gaze Estimation Using the Pupil Center and Corneal Reflections", IEEE Transactions on Biomedical Engineering, vol. 53, No. 6, Jun. 2006, pp. 1124-1133.
Dan Witzner Hansen and Qiang Ji "In the Eye of the Beholder: A Survey of Models for Eyes and Gaze", IEEE Transactions on Pattern Analysis and Machine Intelligence, vol. 32, No. 3, Mar. 2010, pp. 478-500.
U. Weidenbacher, G. Layher, P.-M. Strauss and H. Neumann, "A Comprehensive Head Pose and Gaze Database", Conference Paper—Oct. 2007, IEEE Xplore, ResearchGate, 5 pages.
Qiang Ji and Zhiwei Zhu: "Eye and Gaze Tracking for Interactive Graphic Display", Int. Symp. on Smart Graphics, Jun. 11-13, 2002, Hawthorne, NY, USA, ACM 1581132166/02/07, 7 pages.
Pieter Blignaut: "Mapping the Pupil-Glint Vector to Gaze Coordinates in a Simple Video-Based Eye Tracker", Journal of Eye Movement Research, 7(1):4, 2014, pp. 1-11.
Xuemei Wu, Jing Li, Qiang Wu, and Jiande Sun: "Appearance-Based Gaze Block Estimation via CNN Classification", 978-1-5090-3649-3/17, 2017 IEEE, 5 pages.
Joseph Lemley, Shabab Bazrafkan and Peter Corcoran: "Smart Augmentation Learning an Optimal Data Augmentation Strategy", 2017 IEEE, vol. 5, pp. 5858-5868.
Kenneth Alberto Funes Mora, Florent Monay, and Jean-Marc Odobez: "EYEDIAP: A Database for the Development and Evaluation of Gaze Estimation Algorithms from RGB and RGB-D Cameras", 2014 Symposium on Eye Tracking Research & Applications 2014, 4 pages.
Chunfei Ma, Kang-A Choi, Byeong-Doo Choi, Sung-Jea Ko: "Robust Remote Gaze Estimation Method Based on Multiple Geometric Transforms", Korea University, Department of Electrical Engineering, Seoul, Korea, 20 pages.
Lecun, et al,: "Backpropagation Applied to Handwritten Zip Code Recognition", Neural Computation 1, 1989, MIT, pp. 541-551.
Cagatay Murat Yilmaz, Cemal Kose: "Local Binary Pattern Histogram Features for onscreen Eye-Gaze Direction Estimation and a Comparison of Appearance Based Methods", 978-1-5090-1288-6/16, 2016 IEEE, pp. 693-696.
Hu-chuan Lu, Chao Wang,Yen-wei Chen: "Gaze Tracking by Binocular Vision and LBP Features" 978-1-4244-2175-6/08, 2008 IEEE, 4 pages.
Dmitri Model and Moshe Eizenman "User-Calibration-Free Remote Eye-Gaze Tracking System With Extended Tracking Range"., Department of Electrical and Computer Engineering, Institute of Biomaterials and Biomedical Engineering, Department of Ophthalmology and Vision Sciences, University of Toronto, 4 pages.
Robert Konrad, Shikhar Shrestha, Paroma Varma: "Near-Eye Display Gaze Tracking via Convolutional Neural Networks", Stanford University, 8 pages.
Joseph Lemley, Shabab Bazrafkan and Peter Corcoran: "Transfer Learning of Temporal Information for Driver Action Classification" MAICS 2017, pp. 123-128.
Chi Jian-nan, Zhang Chuang, Yan Yan-tao, Liu Yang, Zhang Han: "Eye Gaze Calculation Based on nonlinear polynornial and Gener- (56) References Cited

OTHER PUBLICATIONS alized Regression Neural Network", 2009 Fifth International Conference on Natural Computation, 978-0-7695-3736-8/09 IEEE, pp. 617-623.
Takehiko Ohno and Naoki Mukawa: "A Free-head, Simple Calibration, Gaze Tracking System That Enables Gaze-Based Interaction", Proceeding of the symposium on ETRA 2004; eye tracking research and applications symposium, pp. 115-122.
Qiuhai He, Xiaopeng Hong, Xiujuan Chai, Jukka Holappa, Guoying Zhao, Xilin Chen and Matti Pietikäinen: "OMEG: Oulu Multi-Pose Eye Gaze Dataset", Springer International Publishing Switzerland 2015, R.R. Paulsen and K.S. Pedersen (Eds.): SCIA 2015, LNCS 9127, pp. 418-427, DOI: 10.1007/978-3-319-19665-7_35.
Xucong Zhang, Yusuke Sugano, Andreas Bulling: "Everyday Eye Contact Detection Using Unsupervised Gaze Target Discovery, UIST 2017, Oct. 22-25, 2017, Quebec City, QC, Canada, ACM 978-1-4503-4981-9/17/10, pp. 193-203.
Kang Wang and Qiang Ji: "Real Time Eye Gaze Tracking with Kinect", 2016 23rd International Conference on Pattern Recognition (ICPR), Cancún Center, Cancún, México, Dec. 4-8, 2016, 978-1-5090-4847-2/16/ 2016 IEEE, pp. 2752-2757.
Christopher D. McMurrough, Vangelis Metsis, Jonathan Rich, Fillia Makedon: An Eye Tracking Dataset for Point of Gaze Detection, ETRA 2012, Santa Barbara, CA, Mar. 28-30, 2012, ACM 978-1-4503-1225-7/12/0003, pp. 305-308.
Takashi Nagamatsu, Junzo Kamahara, Naoki Tanaka: "Calibration-free Gaze Tracking Using a Binocular 3D Eye Model", CHI 2009~Spotlight on Works in Progress~Session 1, Apr. 4-9, 2009~Boston, MA, USA, ACM 978-1-60558-247-4/09/04, pp. 3613-3618.
Xucong Zhang, Yusuke Sugano, Mario Fritz, Andreas Bulling: "Appearance-Based Gaze Estimation in the Wild", n IEEE Conference on Computer Vision and Pattern Recognition (CVPR), Jun. 2015, pp. 4511-4520.
Anjith George and Aurobinda Routray: "Real-time Eye Gaze Direction Classification Using Convolutional Neural Network", Kharagpur, 721302, India, 978-1-5090-1746-1/16, IEEE, 5 pages.
Yu-Tzu Lin & Ruei-Yan Lin & Yu-Chih Lin & Greg C. Lee, "Real-time eye-gaze estimation using a low-resolution webcam", Springer Science+Business Media, LLC 2012, Aug. 14, 2012, DOI 10.1007/s11042-012-1202-1, pp. 543-568.
K. Ruhland, C. E. Peters, S. Andrist, J. B. Badler, N. I. Badler, M. Gleicher, B. Mutlu and R. McDonnell, "A Review of Eye Gaze in Virtual Agents, Social Robotics and HCI: Behaviour Generation, User Interaction and Perception", Computer Graphics Forum, vol. 00 (2015), No. 0 pp. 1-28, 2015 The Eurographics Association and John Wiley & Sons Ltd. Published by John Wiley & Sons Ltd., DOI: 10.1111/cgf.12603.
Rizwan Ali Naqvi, Muhammad Arsalan, Ganbayar Batchuluun, Hyo Sik Yoon and Kang Ryoung Park, "Deep Learning-Based Gaze Detection System for Automobile Drivers Using a NIR Camera Sensor", Sensors 2018, 18, 456; doi:10.3390/s18020456, www.mdpi.com/journal/sensors, 34 pages.
Ashish Shrivastava, Tomas Pfister, Oncel Tuzel, Josh Susskind, Wenda Wang, Russ Webb: "Learning from Simulated and Unsupervised Images through Adversarial Training", Computer Vision Foundation, 2017, IEEE, pp. 2107-2116.
Eroll Wood and Andreas Bulling: "EyeTab: Model-based gaze estimation on unmodified tablet computers", University of Cambridge, Max Planck Institute for Informatics, 4 pages.
Jie Zhu, Jie Yang: "Subpixel Eye Gaze Tracking",Carnegie Mellon University, 6 pages.
Yusuke Sugano, Yasuyuki Matsushita, Yoichi Sato: "Learning-by-Synthesis for Appearance-based 3D Gaze Estimation", The University of Tokyo, Microsoft Research Asia, 8 pages.
Marc Tonsen, Julian Steil, Yusuke Sugano, Andreas Bulling: "InvisibleEye: Mobile Eye Tracking Using Multiple Low-Resolution Cameras and Learning-Based Gaze Estimation", Proceedings of the ACM on Interactive, Mobile, Wearable and Ubiquitous Technologies, vol. 1, No. 3, Article 106, 2474-9567/2017/9-ART106, DOI: 10.1145/3130971, 21 pages.

Xucong Zhang, Yusuke Sugano, Mario Fritz, Andreas Bulling: "MPIIGaze: Real-World Dataset and Deep Appearance-Based Gaze Estimation", Transactions on Pattern Analysis and Machine Intelligence, DOI 10.1109/TPAMI.2017.2778103, IEEE, 14 pages.
Vytautas Vaitukaitis and Andreas Bulling: "Eye Gesture Recognition on Portable Devices", UbiComp '12, Sep. 5-Sep. 8, 2012, Pittsburgh, USA, ACM 978-1-4503-1224-0/12/09, 4 pages.
Paul Viola and Michael Jones: "Rapid Object Detection using a Boosted Cascade of Simple Features", Accepted Conference on Computer Vision and Pattern Recognition 2001, 9 pages.
Erroll Wood,Tadas Baltrusaitis, Xucong Zhang, Yusuke Sugano, Peter Robinson, Andreas Bulling: "Rendering of Eyes for Eye-Shape Registration and Gaze Estimation", Computer Vision Foundation, IEEE, 2015, 9 pages.
Yulan Liang, Michelle L. Reyes, and John D. Lee: "Real-Time Detection of Driver Cognitive Distraction Using Support Vector Machines", IEEE Transactions on Intelligent Transportation Systems, vol. 8, No. 2, Jun. 2007,1524-9050, pp. 340-350.
Zhiwei Zhu and Qiang Ji: "Novel Eye Gaze Tracking Techniques Under Natural Head Movement", IEEE Transactions on Biomedical Engineering, vol. 54, No. 12, Dec. 2007. pp. 2246-2260.
Haoping Deng and Wangjiang Zhu: "Monocular Free-head 3D Gaze Tracking with Deep Learning and Geometry Constraints", Computer Vision Foundation, 2017, IEEE Xplore, 10 pages.
S. Baluja and D. Pomerleau, "Non-intrusive gaze tracking using artificial neural networks," Pittsburgh, PA, USA, Tech. Rep., 1994, pp. 753-760.
M. Kim, O. Wang and N. Ng "Convolutional Neural Network Architectures for Gaze Estimation on Mobile Devices", Stanford Reports, 2017, (www://cs231n.stanford.edu/reports/2017/pdfs/229.pdf), 7 pages.
A. George and A. Routray, "Real-time eye gaze direction classification using convolutional neural network," in 2016 International Conference on Signal Processing and Communications (SPCOM), Jun. 2016, pp. 1-5.
Laura Florea, Comeliu Florea, Ruxandra Vrănceanu, Constantin Vertan: "Can Your Eyes Tell Me How You Think? A Gaze Directed Estimation of the Mental Activity", 2013 11 pages.
Zhiwei Zhu, Qiang Ji, Kristin P. Bennett: "Nonlinear Eye Gaze Mapping Function Estimation via Support Vector Regression", Proceedings of the 18th International Conference on Pattern Recognition (ICPR'06), 0-7695-2521-0/06, 2006, IEEE, 4 pages.
Seung-Jin Baek, Kang-A Choi, Chunfei Ma, Young-Hyun Kim, and Sung-Jea Ko: "Eyeball Model-based Iris Center Localization for Visible Image-based Eye-Gaze Tracking Systems", 0098 3063/13/, 2013 IEEE, pp. 415-421.
Yafei Wang, Tianyi Shen, Guoliang Yuan, Jiming Bian, Xianping Fu: "Appearance-based gaze estimation using deep features and random forest regression" Knowledge-Based Systems 110 (2016), 0950-70511, 2016 Elsevier B.V. pages 293-230.
Anuradha Kar, and Peter Corcoran: "A Review and Analysis of Eye-Gaze Estimation Systems, Algorithms and Performance Evaluation Methods in Consumer Platforms", vol. 5, 2017 IEEE, pp. 16495-16519.
Stylianos Asteriadis, Dimitris Soufleros, Kostas Karpouzis, Stefanos Kollias: "A Natural Head Pose and Eye Gaze Dataset", AFFINE '09, Nov. 6, 2009, ACM 978-1-60558-692-2-1/09/11, 4 pages.
Joseph Lemley, Shabab Bazrafkan, Peter Corcoran: "Learning data Augmentation for Consumer Devices and Services", 2018 IEEE International Conference on Consumer Electronics (ICCE), 978-1-5386-3025-9/18, 3 pages.
Georgescu and Stec: U.S. Appl. No. 15/879,310, filed Jan. 24, 2018 entitled :Method and System for Correcting a Distorted Input Image.
Ciuc, et al, U.S. Appl. No. 15/912,946, filed Mar. 6, 2018 entitled: "Facial Features Tracker With Advanced Training for Natural Rendering of Human Faces in Real-Time".
Bigioi, et al., U.S. Appl. No. 62/592,665, filed Nov. 30, 2017 entitled :Peripheral Processing Device.
Munteanu, U.S. Appl. No. 15/955,426, filed Apr. 17, 2018 entitled "Neural Network Engine".

(56) References Cited

OTHER PUBLICATIONS

S. Deepthi Iyer and Hariharan Ramasangu: "Hybrid LASSO and Neural Network Estimator for Gaze Estimation", 2016 IEEE, 978-1-5090-2597-8/16, pp. 2579-2582.
Anjith George and Aurobinda Routray: "Fast and accurate algorithm for eye localisation for gaze tracking in low-resolution images", IET Comput. Vis., 2016, vol. 10 Iss. 7, pp. 660-669. www.//dlib.net/face_landmark_detection.py.html.
Hyunsung Park and Daijin Kim, "Gaze Classification on a Mobile Device by using Deep Belief Networks", 2015 3rd IAPR Asian Conference on Pattern Recognition, IEEE, pp. 685-689.
Tadas Baltrusaitis, Peter Robinson, Louis-Philippe Morency: "OpenFace: an open source facial behavior analysis toolkit" 10 pages.
Yang Fu and Wei-Ping Zhu, Daniel Massicotte, "A Gaze Tracking Scheme with Low Resolution Image", 2013 IEEE, 4 pages.
Sheng-Wen Shih and Jin Liu, "A Novel Approach to 3-D Gaze Tracking Using Stereo Cameras", IEEE Transactions on Systems, Man, and Cybernetics—Part B: Cybernetics, vol. 34, No. 1, Feb. 2004, pp. 234-245.
David Beymer and Myron Flickner, "Eye Gaze Tracking Using an Active Stereo Head", Proceedings of the 2003 IEEE Computer Society Conference on Computer Vision and Pattern Recognition (CVPR'03), 8 pages.
Shuo Chen, Chengjun Liu, "Eye detection using discriminatory Haar features and a new efficient SVM", Image and Vision Computing 33 (2015) 68-77.
R. Konrad, S. Shrestha, and P. Varma, "Near-eye display gaze tracking via convolutional neural networks."
Y. Wang, T. Shen, G. Yuan, J. Bian, and X. Fu, "Appearance-based gaze estimation using deep features and random forest regression," Know.-Based Syst., vol. 110, No. C, pp. 293-301, Oct. 2016. [Online]. Available: https://doi.org/10.1016/j.knosys.2016.07.038.
Jianzhong Wang, Guangyue Zhang and Jiadong Shi, "2D Gaze Estimation Based on Pupil-Glint Vector Using an Artificial Neural Network", Appl. Sci. 2016, 6, 174; 17 pages.
Xiaolong Zhou, Haibin Cai, Zhanpeng Shao, Hui Yu and Honghai Liu, "3D Eye Model-Based Gaze Estimation from a Depth Sensor", Proceedings of the 2016 IEEE, International Conference on Robotics and Biomimetics, Qingdao, China, Dec. 3-7, 2016, 6 pages.
Qiong Huang, Ashok Veeraraghavan, Ashutosh Sabharwal, "TabletGaze: dataset and analysis for unconstrained appearance-based gaze estimation in mobile tablets", Machine Vision and Applications (2017) 28:445-461, 17 pages.
Yu-Tzu Lin, Ruei-Yan Lin, Yu-Chih Lin, Greg C. Lee, "Real-time eye-gaze estimation using a low-resolution webcam", Multimed Tools Appl (2013) 65:543-568.
Karen Simonyan & Andrew Zisserman, "Very Deep Convolutional Networks for Large-Scale Image Recognition", conference paper at ICLR 2015, 14 pages.
Chi Zhang, Rui Yao, and Jinpeng Cai, "Efficient Eye Typing with 9-direction Gaze Estimation", arXiv:1707.00548v1 [cs.CV] Jul. 3, 2017, 9 pages.
Siqi Nie, Meng Zheng, Qiang Ji, "Deep Regression Bayesian Network and Its Applications" arXiv:1710.04809v1 [cs.LG] Oct. 13, 2017, 14 pages.
Shabab Bazrafkan, Student, IEEE, Hossein Javidnia, Student, IEEE and Peter Corcoran,"Face Synthesis with Landmark Points from Generative Adversarial Networks and Inverse Latent Space Mapping", 5 pages.
Yi-Leh Wu & Chun-Tsai Yeh &Wei-Chih Hung & Cheng-Yuan Tang, "Gaze direction estimation using support vector machine with active appearance model", Multimed Tools Appl (2014) 70, 2037-2062.
Timo Schneider, Boris Schauerte, and Rainer Stiefelhagen, "Manifold Alignment for Person Independent Appearance-based Gaze Estimation", 2014 22nd International Conference on Pattern Recognition, IEEE, pp. 1167-1172.
Ashish Tawari and Mohan M. Trivedi, "Robust and Continuous Estimation of Driver Gaze Zone by Dynamic Analysis of Multiple Face Videos", 2014 IEEE Intelligent Vehicles Symposium (IV), Jun. 8-11, 2014. Dearborn, Michigan, USA, 978-1-4799-3637-3/14, 2014 IEEE, pp. 344-349.

\* cited by examiner

NEURAL NETWORK IMAGE PROCESSING APPARATUS

FIELD

The present invention relates to a neural network image processing apparatus.

BACKGROUND

There is a need for eye gaze tracking applications and gaze-based human computer interactions for dynamic platforms such as driver monitoring systems and handheld devices. For an automobile driver, eye based cues such as levels of gaze variation, speed of eyelid movements and eye closure can be indicative of a driver's cognitive state. These can be useful inputs for intelligent vehicles to understand driver attentiveness levels, lane change intent, and vehicle control in the presence of obstacles to avoid accidents. Handheld devices like smartphones and tablets may also employ gaze tracking applications wherein gaze may be used as an input modality for device control, activating safety features and controlling user interfaces.

The most challenging aspect of such gaze applications includes operation under dynamic user conditions and unconstrained environments. Further requirements for implementing a consumer-grade gaze tracking system include real-time high-accuracy operation, minimal or no calibration, and robustness to user head movements and varied lighting conditions.

Traditionally, gaze estimation has been done using architectures based on screen light reflection on the eye where corneal reflections from light can be used to estimate point-of-gaze.

Neural networks have also been applied to the problem and S. Baluja and D. Pomerleau, "Non-intrusive gaze tracking using artificial neural networks," Pittsburgh, Pa., USA, Tech. Rep., 1994 discloses using a neural network to map gaze coordinates to low quality cropped eye images.

Kyle Krafka, Aditya Khosla, Petr Kellnhofer, Harini Kannan, Suchendra Bhandarkar, Wojciech Matusik, Antonio Torralba, "Eye Tracking for Everyone" discloses an appearance based convolutional neural network (CNN) based model that uses face landmarks to crop an image into left and right regions. The eye regions and face are then passed to distinct neural networks which output into shared fully connected layers to provide a gaze prediction.

Similarly, M. Kim, O. Wang and N. Ng "Convolutional Neural Network Architectures for Gaze Estimation on Mobile Devices", Stanford Reports, 2017, referring to Krafka also uses separate eye regions extracted from a face region as well as a histogram of gradients map to provide a gaze prediction.

Rizwan Ali Naqvi, Muhammad Arsalan, Ganbayar Batchuluun, Hyo Sik Yoon and Kang Ryoung Park, "Deep Learning-Based Gaze Detection System for Automobile Drivers Using a NIR Camera Sensor", Sensors 2018, 18, 456 discloses capturing a driver's frontal image, detecting face landmarks using a facial feature tracker, obtaining face, left and right eye images, calculating three distances based on three sets of feature vectors and classifying a gaze zone based on the three distances.

X. Zhang, Y. Sugano, M. Fritz, and A. Bulling in both "Appearance-based gaze estimation in the wild," in IEEE Conference on Computer Vision and Pattern Recognition (CVPR), June 2015, pp. 4511-4520 and "MPIIGaze: Real-World Dataset and Deep Appearance-Based Gaze Estimation" IEEE Transactions on Pattern Analysis and Machine Intelligence, 2017, disclose using face detection and facial landmark detection methods to locate landmarks in an input image obtained from a calibrated monocular RGB camera. A generic 3D facial shape model is fitted to estimate a 3D pose of a detected face and to crop and warp the head pose and eye images to a normalised training space. A CNN is used to learn the mapping from the head poses and eye images to gaze directions in the camera coordinate system.

SUMMARY

According to the present invention there is provided a neural network image processing apparatus as claimed in claim 1.

Embodiments substantially simultaneously provide gaze and eyelid opening estimates from both eyes of a detected face within an image.

Embodiments comprise an integrated network where the weights for the various layers are determined once in the same training process to provide eyelid and gaze estimation values—this training can mean that each component (opening, gaze) of the network boosts the other as eyelid opening information can help the system learn more efficiently how to predict gaze, and vice-versa.

There is no need to manually weight gaze angles calculated for separate eye regions and so this reduces human intervention and favours a pure machine learning approach.

BRIEF DESCRIPTION OF THE DRAWINGS

An embodiment of the invention will now be described, by way of example, with reference to the accompanying drawings, in which.

DESCRIPTION OF THE EMBODIMENT

Figure 1:
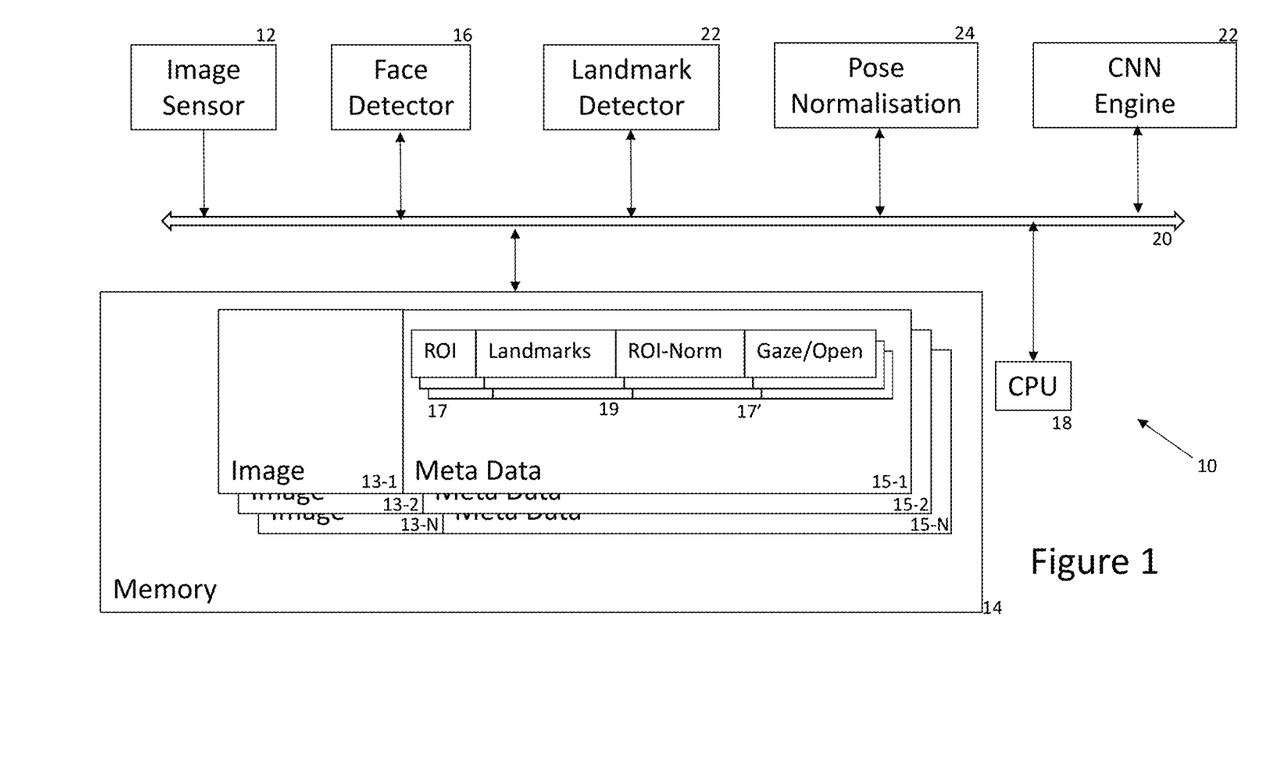
FIG. 1 shows a neural network image processing apparatus according to an embodiment of the present invention.

Referring now to FIG. 1, there is shown a neural network image processing apparatus 10 according to an embodiment of the present invention. The apparatus 10 comprises an image sensor 12 for acquiring images 13-1 . . . 13-N which are subsequently stored in memory 14. Although not shown, the image sensor 12 can include or cooperate with an image processing pipeline for performing initial processing of a raw image such as colour balancing, distortion correction etc. Details of such pre-processing and distortion correction systems are disclosed in PCT Application WO2017/032468 (Ref: FN-469-PCT), European Patent No. EP3101622 (Ref: FN-384-EP2) and U.S. patent application Ser. No. 15/879,310 (Ref: FN-622-US), the disclosures of which are incorporated herein by reference.

Note that the image sensor need not be immediately connected to the remainder of the apparatus 10 and for example, the sensor 12 can provide images for processing by the remainder of the apparatus across any of a local area network, a personal area network, a wide area network and/or any combination of a wired or wireless network.

The image sensor 12 can provide acquired images 13-1 . . . 13-N directly to memory 14 across a system bus 20 or the images 13-1 . . . 13-N can be provided directly to a face detector module 16. Face detection within acquired images is well-known since at least US 2002/0102024, Viola-Jones with many optimisations and improvements made in such systems since then. Thus, the face detector module 16 can be a dedicated hardware module such as the engine disclosed in PCT Application WO 2017/108222 (Ref: FN-470-PCT), the disclosure of which is incorporated by reference, or the face detector can be implemented in general purpose software executing on a system CPU 18, or indeed the face detector 16 could be implemented using one or more convolutional neural networks (CNN) and executed on a dedicated CNN engine 22 such as described in PCT Application WO 2017/129325 (Ref: FN-481-PCT), and U.S. Application No. 62/592,665 (Ref: FN-618-US), the disclosures of which are incorporated herein by reference. Indeed, U.S. application No. 62/592,665 (Ref: FN-618-US) discloses a system including multiple neural network processing cores which can be configured to process multiple neural networks performing different tasks on the same or different images or image portions in parallel.

In any case, once the face detector module 16 has processed an image, any region of interest (ROI) 17 bounding a portion of the image containing a face is identified and this information can be stored in memory as meta data associated with the image 13-1 . . . 13-N. This, may simply comprise bounding box information for the ROI containing the face or as explained below, further information may be included in the meta data for the ROI 17. It will be appreciated that any given image may include a number of detected face regions—in the example, image 13-1 includes 3 ROI 17, and information relating to each of these may be stored as meta data associated with the image 13-1 and processed as and if required.

It will be appreciated that face regions may be detected within an image at one of a number of different scales and at one of a number of different orientations and it may be desirable to transform these detected face regions into a rectangular image crop with a given orientation and scale using techniques such as disclosed in PCT Application WO2017/032468 (Ref: FN-469-PCT). In this case, an image crop can be included in the ROI information 17 stored in association with the image 13-1 . . . 13-N in memory 14.

Nonetheless, even with an image crop of a given orientation and scale, the detected face may be in a number of different poses within the crop, e.g. forward facing, looking up, down, left, right etc.

U.S. application Ser. No. 15/912,946 filed 6 Mar. 2018 (Ref: 10002-0613-US-01), the disclosure of which is incorporated herein by reference discloses tracking units for facial features with advanced training for natural rendering of human faces in real-time. A device receives an image of a face from a frame of a video stream, and based on the image, selects a head orientation class from a comprehensive set of head orientation classes. Each head orientation class includes a respective 3D model. The device determines modifications to the selected 3D model to describe the face in the image, then projects a model of tracking points (landmarks) of facial features in an image plane based on the 3D model. The device can switch among a comprehensive set of 35 different head orientation classes, for example, for each video frame based on suggestions computed from a previous video frame or from yaw and pitch angles of the visual head orientation. Each class of the comprehensive set is trained separately based on a respective collection of automatically marked images for that head orientation class.

Alternatively, libraries such as dlib are available for face landmark detection via the Internet at a website titled "dlib C++ Library".

Figure 2:
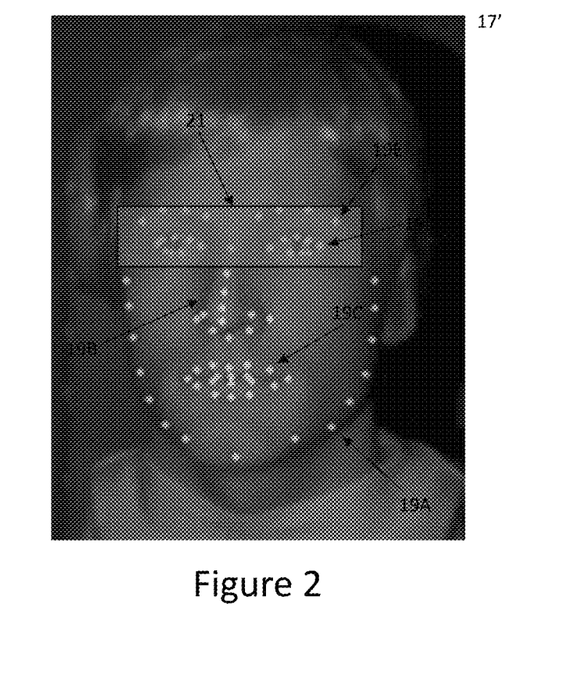
FIG. 2 illustrates a normalised face region derived from an image acquired by the system according to FIG. 1 along with facial landmarks and an eye region identified for the face region.

Such tools can be employed within a landmark detector 22 which produces a set of landmarks 19 for a given image crop containing a face region. FIG. 2 shows an image containing a face region where a number of landmarks have been identified. In this case, the landmarks indicate the jawline 19A, mouth region 19C, nose 19B, eyes 19D and eyebrows 19E of the subject. Note that the present apparatus is typically processing images and image crops of relatively low resolution so that it is typically not possible to explicitly locate or identify features on the eye of the user, for example, a pupil outline which in other applications can be useful for determining gaze angle.

Again, the landmark detector 22 can be implemented as a dedicated module, or the detector 22 can be implemented in general purpose software executing on a system CPU 18. Again, landmark information 19 can be stored in association with the ROI information 17 within the meta-data associated with a given image 13.

Now using the landmarks 19 identified in the original ROI 17, a pose normalisation module 24 can transform the ROI 17 into a face crop in a normalised pose—in this case front facing, such as the face region 17' shown in FIG. 2—and store this as ROI-Norm 17' in association with the original ROI 17.

It will be appreciated that this morphing process may result in an incomplete front facing face image, for example, where the original detected face was a side profile, but this does not necessarily prevent the remainder of the system from performing properly.

Now with the landmarks 19 of a transformed front facing image region and eye region 21 can be defined. In the example, the eye region extend from the highest eyebrow landmark 19E to a margin beyond the lowest eye landmark 19D and from a margin beyond the left-most eye or eyebrow landmark 19D,19E to a margin beyond the right-most eye or eyebrow landmark 19D,19E.

Figure 3:
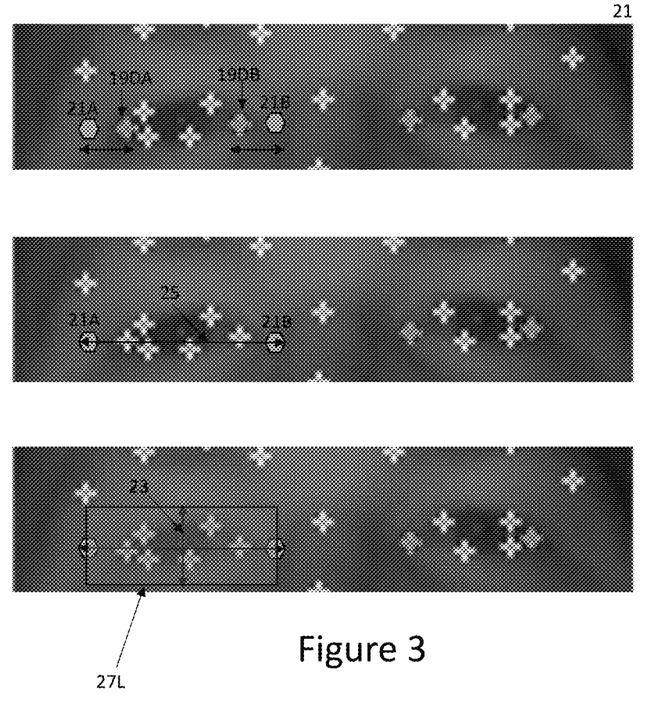
FIG. 3 illustrates the identification of individual eye regions based on the landmarks of FIG. 2.

Referring now to FIG. 3, within the eye region 21, for each eye (only detail for one eye is shown), the corners of the eye 19DA, 19DB are identified and then shifted by a margin away from the centre of the eye to indicate respective left and right boundary points 21A, 21B for each eye. The margin can be a percentage of the distance between corners 19DA and 19DB.

The distance between points 21A, 21B is multiplied by a fixed aspect ratio to determine a height 23 for an eye bounding box. The upper and lower boundary lines of the eye bounding box are centered about a line 25 extending between points 21A, 21B. (If there is a difference in height between eye corner locations 19DA, 19DB, the line 25 can be centred height wise between these locations. Now the defined eye regions (only the left region 27L is shown in FIG. 3) can be fed to a neural network as shown in FIG. 4 to simultaneously determine an eyelid opening value for each eye as well as the gaze angle (both pitch and yaw) for the pair of eyes.

Figure 4:
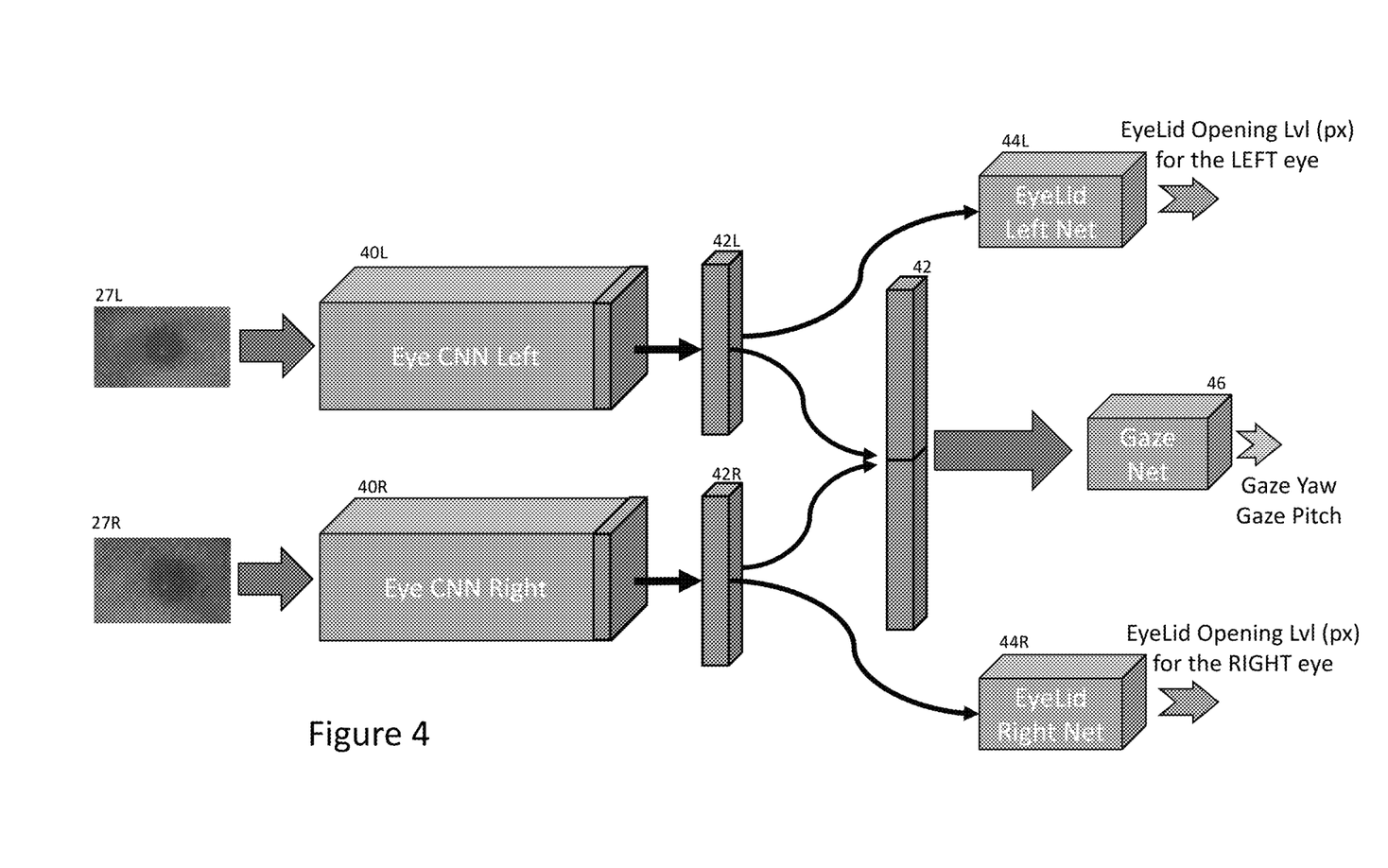
FIG. 4 illustrates the configuration of a convolutional neural network implemented with the system of FIG. 1 for identifying a gaze angle and eyelid opening for eye regions provided to the system.

FIG. 4 shows each eye region 27L, 27R fed to a respective CNN 40L, 40R. More specific details of the layers comprising each CNN 40L, 40R will be provided below, for the moment is it sufficient to note that the output layer 42L, 42R of each CNN 40L, 40R comprise a feature vector comprising a plurality of values, typically of the order of between 128 and 256 floating point values. Nonetheless, it will be appreciated that in alternative implementations, the feature vector may comprise fewer or more than these exemplary values. Note that the format of these values can be as disclosed in PCT Application WO 2017/129325 (Ref: FN-481-PCT) and U.S. application Ser. No. 15/955,426 (Ref: FN-626-US), the disclosures of which are incorporated herein by reference.

While each of the left and right feature vectors 42L, 42R can be fed to separate respective networks 44L, 44R, each for providing a measure of eyelid opening, the feature vectors are concatenated into a single feature vector 42 which is provided as an input layer to a gaze angle network 46. It will be appreciated that other mechanisms for combining the feature vectors 42L, 42R before or as they are fed to the gaze angle network 46 may be employed, for example, they could be supplied as separate input maps to an input layer of the network 46. In this regard, it should also be appreciated that the feature vectors 42L, 42R are not confined to comprising 1×M values and instead could comprise feature maps with A×B=M values.

The output layer each network 44L, 44R comprises an integer corresponding to number of pixels indicating a level of opening of a given eye.

The output layer of network 46 comprises a pair of numbers indicating a gaze horizontal angle (yaw) and gaze vertical angle (pitch) for the pair of eye regions 27L, 27R.

Figure 5:
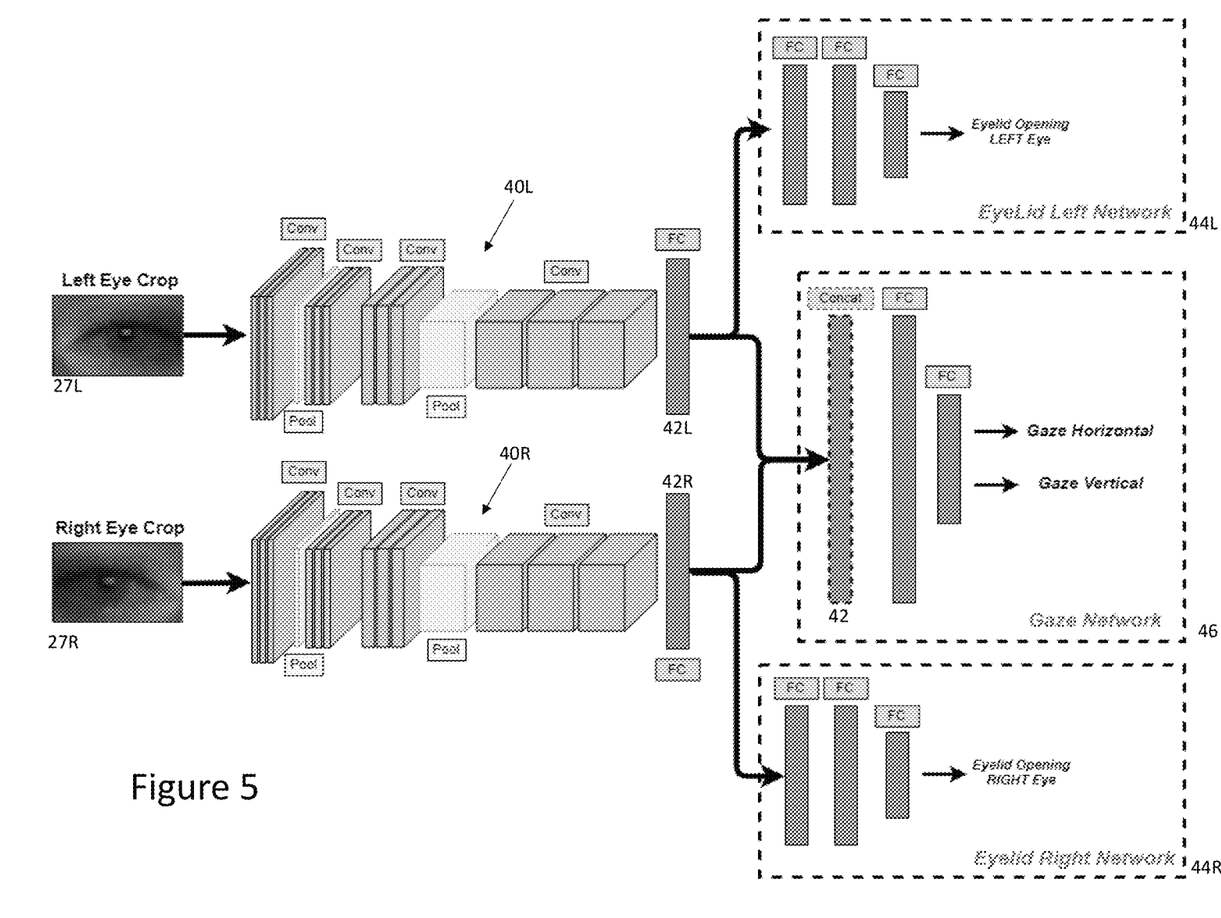
FIG. 5 shows the configuration of the convolutional neural network in more detail.

Referring now to FIG. 5, each of the CNNs 40L, 40R can comprise a number of convolutional layers (Cony) interleaved with pooling layers (Pool). In one example, each convolutional layer includes an activation function for example the ReLU function, as described in U.S. application Ser. No. 15/955,426 (Ref: FN-626-US), however, it will be appreciated that other activation functions such as PReLU could also be employed. The pooling layers can for example, comprise any of average or max pooling or alternatively functions such as peak as described in U.S. application Ser. No. 15/955,426 (Ref: FN-626-US). As an alternative or in addition to pooling layers, convolution layers with strides (steps) greater than one can be employed.

A final fully connected layer (FC) again including a ReLU activation function produces the output feature vectors 42L, 42R.

Each of the networks 44L, 44R and 46 need only comprise an input fully connected layer (whose nodes correspond with the values of the input feature vectors 42L, 42R and 42), again including a ReLU activation function and either a 2 node (in the case of network 46) or single node (in the case of networks 44L, 44R) output layer, again comprising an activation function such as ReLU.

Note that the values produced by the gaze network 46 need to be mapped back through the transformation based on the landmarks 19 and indeed any original rotation and/or scaling of the original ROI within the acquired image 13 to provide a meaningful gaze location in the coordinate space of the apparatus 10. This can be done either mathematically or using appropriate look-up tables.

It will be appreciated that with an appropriate common training set comprising labelled images including face regions with eyes at a variety of gaze angles and opening levels, the network illustrated in FIG. 5 can be trained jointly so that each network can boost the other.

The networks 44L, 44R and 46 can substantially simultaneously provide eyelid opening and gaze values for any region of interest 13 detected within an image and especially when implemented on a multi-processor core such as disclosed in U.S. application No. 62/592,665 (Ref: FN-618-US), results can readily be provided in real-time.

The invention claimed is:

1. An apparatus comprising:
one or more processors configured to:
acquire an image from an image sensor;
identify a region of interest containing a face region in the image;
determine a plurality of facial landmarks in the face region within the region of interest;
use said plurality of said facial landmarks to transform said face region into a transformed face region having a given pose;
use transformed landmarks within said transformed face region to identify a pair of eye regions within said transformed face region;
feed each identified eye region of said pair of eye regions to a respective first and second convolutional neural network, each network configured to produce a respective feature vector comprising a plurality of numerical values;
feed each feature vector to respective eyelid opening level neural networks to obtain a respective eyelid opening value for each eye region;
combine the feature vectors into a combined feature vector; and
feed the combined feature vector to a gaze angle neural network to generate gaze yaw and pitch values substantially simultaneously with the eyelid opening values, wherein said eyelid opening level neural networks and said gaze angle neural network are jointly trained based on a common training set.

2. The apparatus according to claim 1 further comprising a multi-processor neural network core which substantially simultaneously processes layers from said first and second convolutional networks and which substantially simultaneously processes layers from said eyelid opening level neural networks and said gaze angle neural network.

3. The apparatus according to claim 1 wherein at least one of said feature vectors comprises a plurality of floating point numbers.

4. The apparatus according to claim 1 wherein at least one of said feature vectors comprises at least 128 32-bit floating point numbers.

5. The apparatus according to claim 1 wherein said given pose is a front facing pose.

6. The apparatus according to claim 1 wherein at least one of said pair of eye regions comprises an area including an eye related landmark or an eyebrow related landmark.

7. The apparatus according to claim 1 wherein at least one of said pair of eye regions is rectangular.

8. The apparatus according to claim 1 wherein at least one of said pair of eye regions comprises a fixed aspect ratio.

9. The apparatus according to claim 1 wherein at least one of said first convolutional neural network or said second convolutional neural network comprises a combination of a convolutional layer and a pooling layer.

10. The apparatus according to claim 9 wherein said convolution layer comprises an activation function.

11. The apparatus according to claim 1 wherein said gaze angle network comprises a fully connected layer.

12. The apparatus according to claim 1 wherein at least one of said eyelid opening level neural networks comprises a fully connected layer.

13. The apparatus according to claim 1 wherein said facial landmarks delineate at least one of a jaw, mouth, nose, eye, or eyebrow.

14. The apparatus according to claim 1 wherein said facial landmarks do not delineate any feature on an eye.

15. The apparatus according to claim 1 wherein said apparatus is further configured to combine said feature vectors by concatenating the feature vectors.

16. The apparatus according to claim 1 wherein said feature vectors comprise either 1×M or A×B=M values, wherein A, B, and M are integers.

17. A system comprising:
one or more processors;
memory communicatively coupled to the one or more processors, the memory storing instructions that, when executed by the one or more processors, causes the system to perform operations comprising:
acquiring an image from an image sensor;
identifying a region of interest containing a face region in the image;
determining a plurality of facial landmarks in the face region within the region of interest;
using said plurality of facial landmarks to transform said face region into a transformed face region having a given pose;
using transformed landmarks within said transformed face region to identify a pair of eye regions within said transformed face region;
feeding each identified eye region of said pair of eye regions to a respective first and second convolutional neural network, each network configured to produce a respective feature vector comprising a plurality of numerical values;
feeding each feature vector to respective eyelid opening level neural networks to obtain a respective eyelid opening value for each eye region;
combining the feature vectors into a combined feature vector; and
feeding the combined feature vector to a gaze angle neural network to generate gaze yaw and pitch values substantially simultaneously with the eyelid opening values, wherein said eyelid opening level neural networks and said gaze angle neural network are jointly trained based on a common training set.

18. The system according to claim 17, wherein at least one of said pair of eye regions comprises an area including an eye related landmark or an eyebrow related landmark.

19. A method comprising:
acquiring an image from an image sensor;
identifying a region of interest containing a face region in the image;
determining a plurality of facial landmarks in the face region within the region of interest;
using said plurality of facial landmarks to transform said face region into a transformed face region having a given pose;
using transformed landmarks within said transformed face region to identify a pair of eye regions within said transformed face region;
feeding each identified eye region of said pair of eye regions to a respective first and second convolutional neural network, each network configured to produce a respective feature vector comprising a plurality of numerical values;
feeding each feature vector to respective eyelid opening level neural networks to obtain a respective eyelid opening value for each eye region;
combining the feature vectors into a combined feature vector; and
feeding the combined feature vector to a gaze angle neural network to generate gaze yaw and pitch values substantially simultaneously with the eyelid opening values, wherein said eyelid opening level neural networks and said gaze angle neural network are jointly trained based on a common training set.

20. The method according to claim 19, wherein at least one of said pair of eye regions comprises an area including an eye related landmark or an eyebrow related landmark.

* * * * *